United States Patent [19]

Narita et al.

[11] Patent Number: 5,344,855
[45] Date of Patent: Sep. 6, 1994

[54] FLAME-RETARDANT AND ITS COMPOSITION

[75] Inventors: Noriaki Narita; Masuo Iwata; Kouji Inoue; Hideo Sato, all of Yokohamashi; Ryoji Takahashi, Tokyoto, all of Japan

[73] Assignee: Chisso Corporation, Osaka, Japan

[21] Appl. No.: 85,035

[22] Filed: Jul. 2, 1993

[30] Foreign Application Priority Data

Jul. 8, 1992 [JP] Japan .................................. 4-204426

[51] Int. Cl.$^5$ ........................................... C08K 5/3492
[52] U.S. Cl. ..................... 523/179; 524/100; 524/415; 524/416; 252/609
[58] Field of Search ................. 523/179; 524/416, 415, 524/100; 252/608, 609, 607, 606

[56] References Cited

U.S. PATENT DOCUMENTS

| 4,504,610 | 3/1985 | Fontanelli et al. | 524/100 |
| 5,116,891 | 5/1992 | Eberspach et al. | 524/416 |
| 5,223,560 | 6/1993 | Cipolli et al. | 524/100 |

Primary Examiner—Veronica P. Hoke
Attorney, Agent, or Firm—Fred Philpitt

[57] ABSTRACT

A flame-retardant consisting of two specified components and a flame-retardant resin composition having the flame-retardant blended with a thermoplastic resin are provided, which flame-retardant is composed of (A) a reaction product of cyanuric chloride with a diamine and (B) ammonium polyphosphate or polyphosphoric acid amide, the ratio of (A) to (B) being 0.1 to 10, and which flame-retardant resin composition has the flame-retardant blended with a thermoplastic resin in a quantity of 1 to 50% by weight based upon the weight of the composition.

5 Claims, 7 Drawing Sheets

FLAME-RETARDANT AND ITS COMPOSITION

BACKGROUND OF THE INVENTION

1. Field of the Invention

This invention relates to a flame-retardant provided by combining a reaction product of cyanuric chloride with a diamine with a specified phosphorus compound, and a flame-retardant resin composition obtained by blending the flame-retardant with a thermoplastic resin or its elastomer.

2. Description of the Related Art

Certain techniques for reducing polymer combustibility have already been known. For example, there are examples using metal hydroxide compounds such as hydrated alumina, magnesium hydroxide, etc., and as other examples, combinations of a halogenic organic flame-retardant with antimony oxide have been broadly known. However, in the former case, it is necessary to add a large quantity of the retardant to polymers, and in the latter case, there has been a drawback that gas or dusts harmful to human body occur at the time of combustion.

In order to solve the above-mentioned problems, according to recent research, a technique has been proposed that when an inorganic or organic phosphorus compound is combined with a nitrogen-containing compound and the resulting combination is added to polymers, the resulting polymers are made flame-retardant even if the quantity of the combination is relatively small. For example, a combination of a substance obtained by adding an alkylamine to a triazine core and converting the resulting compound into an oligomer or a polymer with a diamine, with a phosphorus compound (Japanese patent application laid-open No. Sho 59-147050), a combination of tris-(2-hydroxyethyl)-isocyanurate with a phosphorus compound (Japanese patent application laid-open Nos. Sho 54-53156, Sho 61-261334 and Sho 63-61055), etc. have been known.

However, such combinations cannot be regarded as fully satisfying the properties required for flame-retardant compositions, that is, in the former example case, a sufficient flame-retardancy could not have been obtained in a small quantity added, while in the latter example case, since the flame-retardant is water-soluble, it exudes (so-called bleeding) from the polymer due to moisture in air.

The present inventors have made extensive research in order to solve the above-mentioned problems, and as a result, have found that when a reaction product of cyanuric chloride with a diamine is combined with a specified phosphorus compound, the resulting combination exhibits a superior flame-retardancy in a small quantity thereof added and yet, the quantity of smoke or soot discharged is small at the time of combustion, and have completed the present invention.

Namely, the above combination refers to a combination of (A) the above reaction product of the present invention, with (B) ammonium polyphosphate or polyphosphoric acid amide.

As apparent from the foregoing, the object of the present invention is to provide a flame-retardant having a reaction product consisting only of two components of cyanuric chloride and a diamine, combined with a specified phosphorus compound, and a flame-retardant resin composition having the above flame-retardant blended with a thermoplastic resin.

SUMMARY OF THE INVENTION

The present invention has the following constitutions (1) to (8):

(1) A flame-retardant composed of
 (A) a reaction product of cyanuric chloride with a diamine and
 (B) ammonium polyphosphate or polyphosphoric acid amide,
the ratio by weight of (A) to (B) being 0.1 to 10.

(2) A flame-retardant according to item (1), wherein said diamine is expressed by the formula wherein n represents an integer of 2 to 6 and $R_1$ and $R_2$ each represent H or $C_mH_{2m+1}$ wherein m represents an integer of 1 to 3.

(3) A flame-retardant according to item (1) wherein said diamine is piperazine or a diamine containing piperazine ring.

(4) A flame-retardant according to item (3), wherein the reaction molar ratio of cyanuric chloride with the diamine is in the range of 2:1 to 1:3.

(5) A flame-retardant resin composition having a flame-retardant composed of
 (A) a reaction product of cyanuric chloride with a diamine and
 (B) ammonium polyphosphate or polyphosphoric acid amide,
the ratio by weight of (A) to (B) being 0.1 to 10,
 blended with a thermoplastic resin, in a quantity of 1 to 50% by weight based upon the weight of the composition.

(6) A flame-retardant composition according to item (5) wherein said thermoplastic resin is a polyolefin or its elastomer.

DETAILED DESCRIPTION OF PREFERRED EMBODIMENTS

The constitution and effectinveness of the present invention will be described in more detail.

The ammonium polyphosphate of the above (B) is ammonium polyphosphate expressed by the formula $(NH_4)_{n+2}P_nO_{3n+1}$ wherein n represents an integer of 2 or more, and its molecular weight is preferred to be large enough to notably reduce its water-solubility. Further, in order to improve the water-solubility so as to further reduce the water-solubility, those obtained by coating its particles with a thermoset resin may also be used.

Examples of such ammonium polyphosphate is Exolit 422 (tradename of product made by Höchst Co., Ltd.) and Phoscheck P/40 (tradename of product made by Monsanto Co., Ltd.), and an example of ammonium polyphosphate coated with a thermoset resin is Exolit 462 (tradename of product made by Höchst Co., Ltd.).

As to the compound expressed by the above (A), when the reaction temperature and the reaction molar ratio of cyanuric chloride to a diamine are controlled, it is possible to prepare as far as 2:1 product to 1:3 product (preferably 2:3 product). If the reaction molar ratio of cyanuric chloride to a dimaine is less than 2:1, cyanuric chloride remains unreacted. On the other hand, if the ratio exceeds 1:3, the diamine remains unreacted; hence the yield at the time of preparation is lowered.

The reaction product of cyanuric chloride with a diamine directed to the present invention can be easily prepared according to a preparation process disclosed in known literatures. An old example of literatures is a research of Donald W. K. et al (J. Am. Chem. Soc. 73, 2984–2986, 1951), wherein a derivative of 1:1 reaction product of cyanuric chloride with a diamine has been introduced. Another example of known literatures is Research of ANELLI. PL et al (J. Org. Chem. 49, 4197–4203, 1984), wherein the structure of the reaction product of cyanuric chloride with a diamine has been discussed in detail. It appears that the reaction product directed to the present invention, too, may exhibit a structure as shown in the above literatures, but it is insoluble in water or usually known organic solvents; hence it is difficult to identify the molecular weight.

Next, a general preparation process of the reaction product of cyanuric chloride with a diamine will be described in detail.

When the 3 active chlorine atoms of cyanuric chloride are successively replaced by amino group, the reactivities of the remaining chlorine atoms lower notably. Namely, when the chlorine atoms are replaced by amino group one by one, the reaction of amino groups with the remaining chloride atoms is difficult unless the reaction temperature is elevated. In short, the reaction is separated depending upon the replaced active chlorines into the following three steps:

In the first step reaction, cyanuric chloride is dispersed in a polar solvent such as acetone, water, etc., within a temperature range of 0° to 10° C., followed by reacting the dispersion with a diamine in a molar ratio of 2:1, in the presence of an alkali such as NaOH, KOH, etc. or a tertiary amine such as pyridine, triethylamine, etc. The diamine referred to herein means a general term of diamines including a primary or secondary, linear or branched diamine expressed by the formula $HNR_1(CH_2)_nR_2NH$ wherein n represents an integer of 2 to 6 and $R_1$ and $R_2$ each represent H or $C_mH_{2m+1}$ (wherein m represents an integer of 1 to 3), or piperazine or a diamine containing piperazine ring.

Examples of these diamines are ethylenediamine, 1,3-diaminopropane, 1,4-diaminobutane, 1,5-diaminopentane, hexamethylenediamine, N,N'-dimethylethylenediamine, N,N'-diethylethylenediamine, N,N'-diphenylethylenediamine, piperazine, methylpiperazine, diketopiperazine, 1-aminoethylpiperazine, etc.

In the second step reaction, in the case where the reaction product prepared in the first step reaction is filtered and dried and the resulting material is used as an intermediate (raw material), one mol of a diamine and two mols of an alkali such as NaOH, KOH, etc. or a tertiary amine such as pyridine, diethylamine, etc. are added to one mol of the intermediate, followed by reacting the mixture within a temperature range of 40° to 80° C., preferably 50° to 70° C.

As the solvent used at the time, either one of a polar solvent such as acetone, THF (tetrahydrofuran), dichloromethane, etc. or a non-polar solvent such as benzene, carbon tetrachloride, etc. may be chosen.

Further, it does not matter whether, without separating the reaction product obtained at the first step by filtration and drying, an equimolar quantity of a diamine to that of cyanuric chloride first fed to the first reaction solution and twice mols of an alkali are added to the first reaction solution, followed, as it is, by carrying out the second step reaction. After completion of the second reaction, the reaction product is separated by filtration and drying, or the solvent is exchanged according to an azeotropic method or the like, followed by carrying out the third step reaction. However, in the case where a high boiling point solvent such as water, xylene, etc. is used since the first step reaction or the second step reaction, the third step reaction may be succeeded as it is.

In the third step reaction, it is carried out in the same manner as in the second step reaction, using a high boiling point solvent such as water, xylene, dimethyl sulfoxide, etc., and at a temperature of 100° C. or higher. After completion of the reaction, the product is filtered, washed and dried to obtain a preparation product of the present invention in the form of white or pale yellow solids. When the thus obtained reaction product is combined with a specified phosphorus compound, the combination is provided as a flame-retardant.

Further, the ratio by weight of (A) to (B) is in the range of 0.1 to 10, preferably 0.15 to 1, more preferably 0.2 to 0.6. If the ratio by weight is lower than 0.1 or exceeds 10, a resin composition obtained by blending such a flame-retardant with a resin cannot afford a sufficient flame-retardancy.

The flame-retardant resin composition according to the present invention can be prepared for example according to the following process:

An olefin homopolymer or copolymer as a base resin, and a resin such as synthetic rubber, polyolefin resin, polystyrene resin, etc., a coupling agent such as silane group, titanium group, etc., a filler, an additive such as antioxidant, antistatic agent, ultraviolet protective agent, copper damage-preventive agent, aging-preventive agent, lubricant, pigment, etc., and the above-mentioned phosphorus compound (B) and the compound (A) of the present invention are fed each in a definite quantity in a mixing device such as Henschel Mixer (tradename), super mixer, tumbler mixer, cooking mixer, etc., followed by mixing them for one to 10 minutes, melt-kneading the resulting mixture at a melt-kneading temperature of 170° to 230° C. by means of rolls, extruder or the like and pelletizing.

Further, the content of the flame-retardant in the flame-retardant resin composition provided by the present invention is 1 to 50% by weight, preferably 15 to 35% by weight based upon 100% by weight of the total composition. If the content is less than 1% by weight, a superior flame-retardancy cannot be exhibited, while if it exceeds 50% by weight, the mechanical strength of the composition is notably damaged.

Since the compound directed to the present invention is difficultly soluble in water, it does not exude from the blended resin due to moisture in air. Still further, surprisingly enough, it has been found that a more excellent flame-retardancy is exhibited in spite of a small quantity added, as compared with compounds obtained according to so far known method.

(Example)

The present invention will be described in more detail by way of Preparation examples and Examples, but it should not be construed to be limited thereto. Further, the parts described therein mean parts by weight, unless otherwise indicated.

Preparation example 1

Cyanuric chloride (94.1 parts) and acetone (300 parts) were fed in a 1 l four-neck reaction vessel provided with a stirrer, a thermometer and a dropping funnel, followed by simultaneously dropwise adding a solution of ethylene-diamine (15.0 parts) dissolved in acetone (50 parts) and a solution of NaOH (20.1 parts) dissolved in water (60 parts), while keeping the temperature at 0° to 5° C. and with stirring.

After completion of the dropwise addition, the mixture was further agitated at the same temperature for 3 hours, followed by allowing it to stand down to room temperature, dropwise adding a solution of ethylenediamine (15.0 parts) dissolved in acetone (50 parts) over about 30 minutes, thereafter dropwise adding a solution of NaOH (20.1 parts) dissolved in water (60 parts), and keeping the reaction solution under reflux for 10 hours.

After cooling, the resulting product was washed with water and then with acetone, followed by drying it at 70° C. under reduced pressure to obtain an intermediate (86.9 parts) (theoretical yield: 87.8 parts, yield: 98.9%), dispersing 68.6 parts of the intermediate in xylene (500 parts), dropwise adding ethylenediamine (12 parts), successively adding NaOH (16 parts), and reacting them under reflux for 16 hours to obtain a product (I) (yield: 91%) in the form of white solids. The product was insoluble in usual organic solvents and its solubility in water at room temperature was 0.1% or less. Further, the content of remaining chlorine was 4.6%. When the decomposition temperature was measured by a differential thermal balance, the decomposition-initiating temperature was 322° C.

Preparation example 2

Cyanuric chloride (752.2 parts), water (2,000 parts) and ice (300 parts) were fed in a vessel similar to that of Preparation example 1 except that its capacity was 10 l, followed by simultaneously dropwise adding a solution of ethylenediamine (120.2 parts) dissolved in water (600 parts) and a solution of NaOH (160 parts) dissolved in water (600 parts), while keeping the temperature at 0° to 5° C. and with stirring.

After completion of the dropwise addition, the mixture was further agitated at the same temperature for 3 hours, followed by allowing it to stand down to room temperature, dropwise adding a solution of ethylenediamine (240.4 parts) dissolved in water (1,000 parts) over about 90 minutes, thereafter dropwise adding a solution of NaOH (320 parts) dissolved in water (1,000 parts) and keeping the reaction solution under reflux for 10 hours.

After cooling, the product was filtered, followed by washing it with boiling water several times and drying it at 100° C. to obtain a product (II) (yield: 72.0%). The product (II) was insoluble in usual organic solvents and its solubility in water at room temperature was 0.1% or less. Further, the content of remaining chlorine was 3.1%. When the decomposition temperature was measured by a differential thermal balance, the decomposition-initiating temperature was 324° C.

Figure 1:
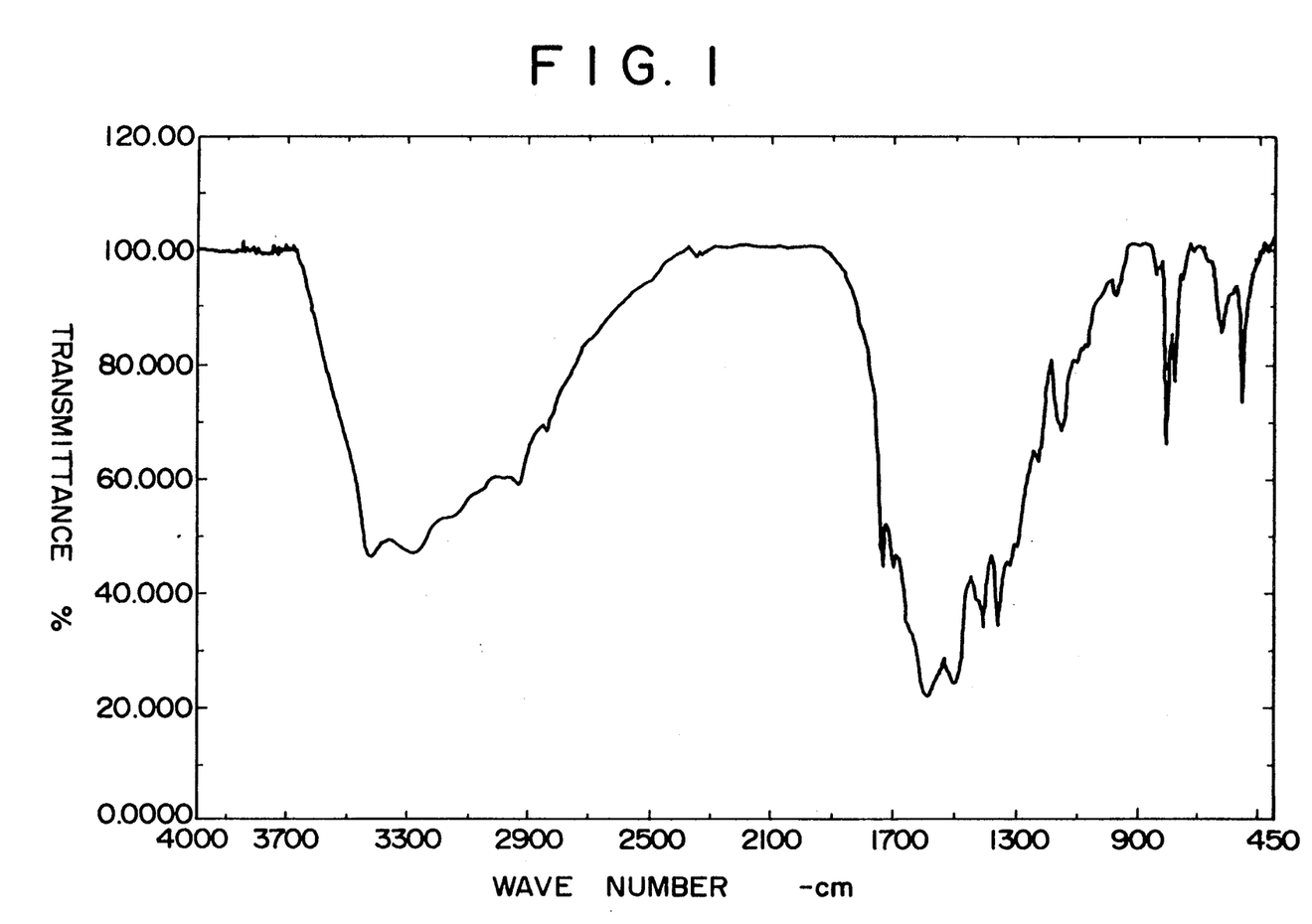
FIG. 1 shows the infrared absorption spectrum of product (II) prepared in preparation example 2.
Figure 2:
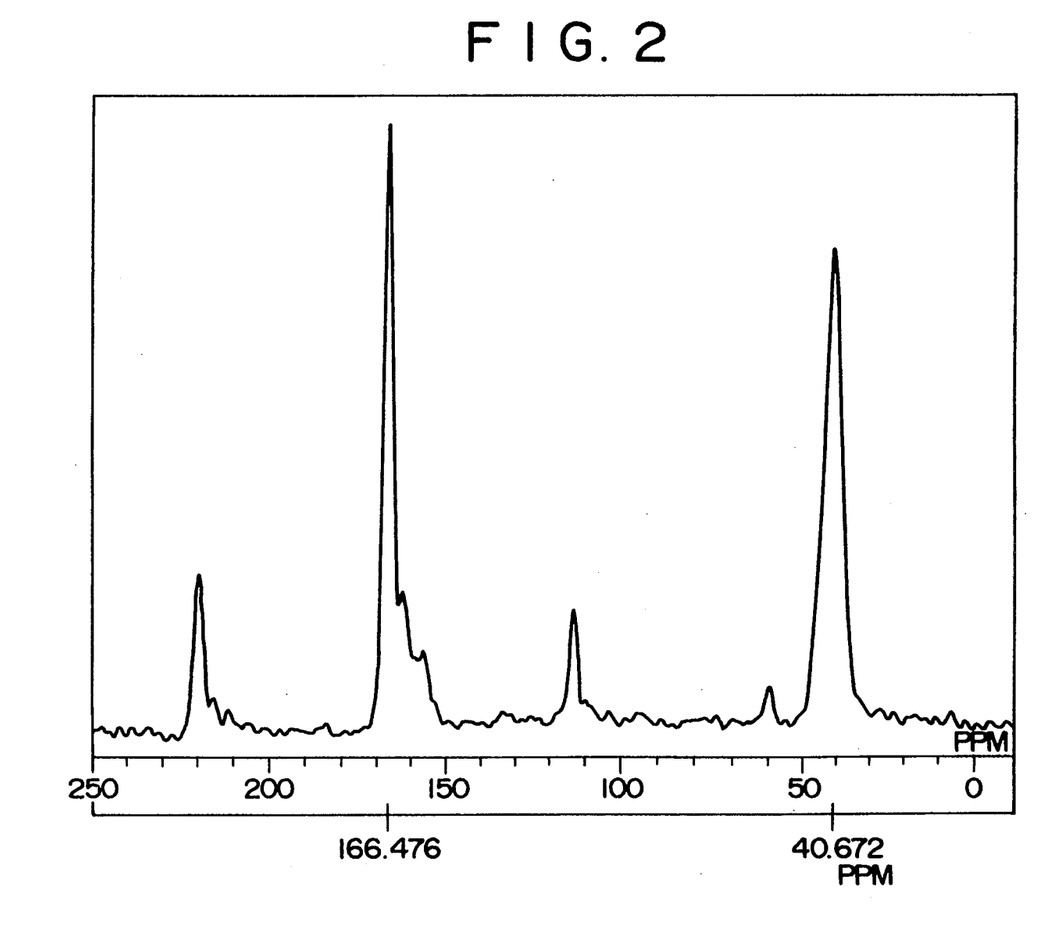
FIG. 2 shows the nuclear magnetic resonance spectrum of product (II) prepared in preparation example 2.

FIGS. 1 and 2, each shows infrared absorption spectra and nuclear magnetic resonance spectra as measured in a solid state.

Preparation example 3

Cyanuric chloride (94.1 parts) and acetone (300 parts) were fed into a reaction vessel similar to that of Preparation example 1, followed by simultanesouly dropwise adding a solution of 1,3-diaminopropane (18.5 parts) dissolved in acetone (50 parts) and a solution of NaOH (20.1 parts) dissolved in water (60 parts), while keeping the temperature at 0° to 5° C. with stirrng.

After completion of the dropwise addition, the mixture was further agitated at the same temperature for 3 hours, followed by allowing it to stand down to room temperature, dropwise adding a solution of 1,3-diaminopropane (18.5 parts) dissolved in acetone (50 parts) over about 30 minutes, thereafter dropwise adding a solution of NaOH (20.1 parts) dissolved in water (60 parts), and keeping the reaction solution under a reflux for 10 hours.

Figure 3:
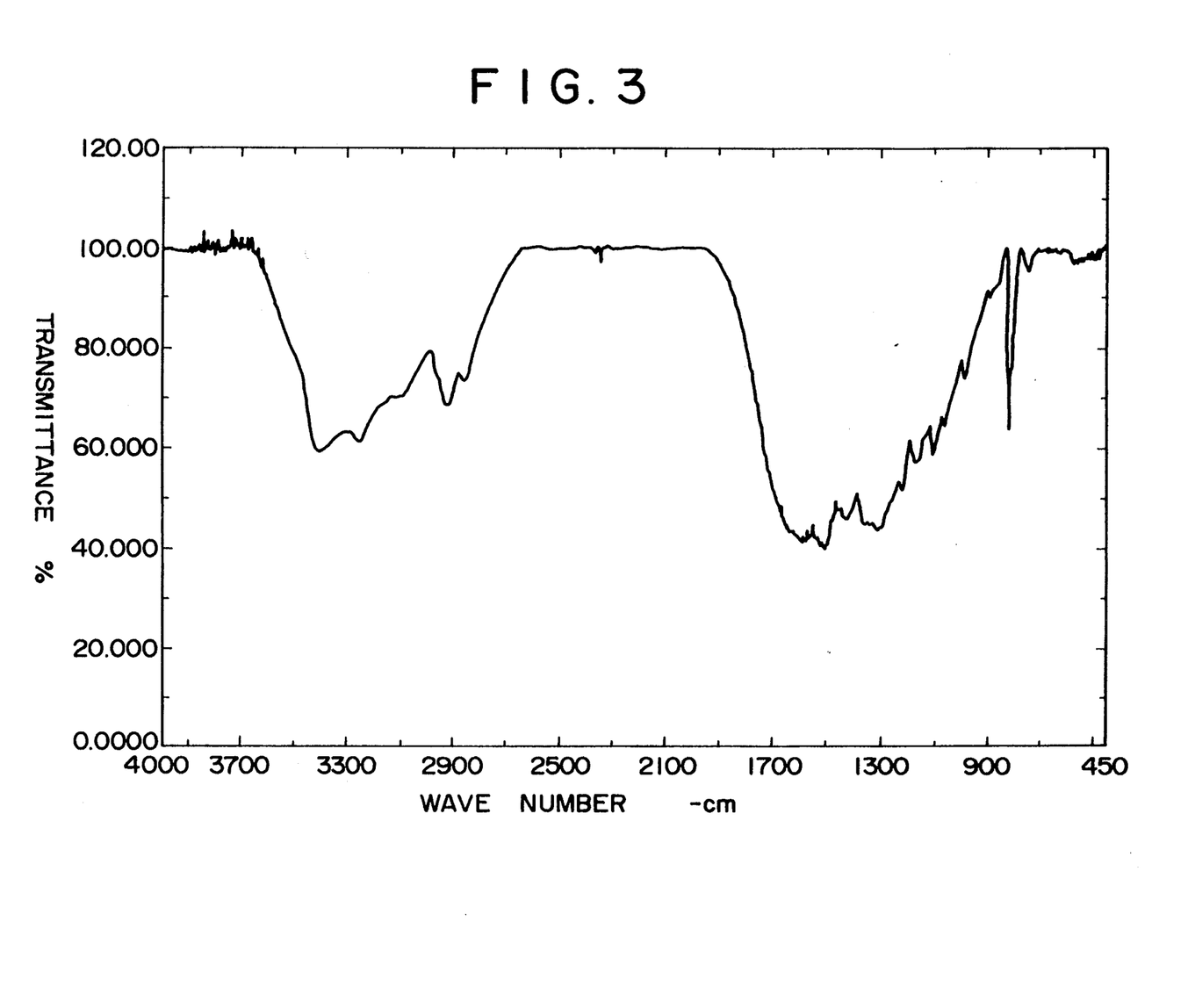
FIG. 3 shows the infrared absorption spectrum of product (III) prepared in preparation example 3.

After cooling, the product was filtered, followed by washing it with water and acetone, and drying it at 70° C. under reduced pressure to obtain an intermediate (yield: 98.9%). This intermediate (74.2 parts) was dispersed in xylene (500 parts), followed by dropwise adding 1,3-diaminopropane (14.8 parts) to the dispersion, successively dropwise adding a solution of NaOH (16 parts) dissolved in water (50 parts), reacting the mixture under reflux for 20 hours while removing water flown out, thereafter washing with acetone and water and drying at 100° C. to obtain a product (III) in the form of pale yellow solids. The product (III) was insoluble in usual organic solvents and its solubility in water at room temperature was 0.1% or lower. The content of remaining chlorine was 3.6%. The decomposition-initiating temperature of the product was 305° C. FIG. 3 shows its infrared absorption spectra.

Preparation example 4

Cyanuric chloride (94.1 parts) and acetone (300 parts) were fed into a reaction vessel similar to that of Preparation example 1, followed by simultaneously dropwise adding a solution of N,N'-diethylethylenediamine (29.1 parts) dissolved in acetone (50 parts) and a solution of NaOH (20.1 parts) dissolved in water (60 parts), while keeping the temperature at 0° to 5° C. with stirring.

After completion of the dropwise addition, the mixture was further agitated at the same temperature for 3 hours, followed by allowing it to stand down to room temperature, dropwise adding a solution of N,N'-diethylethylenediamine (29.1 parts) dissolved in acetone (50 parts) over about 30 minutes, thereafter dropwise adding a solution of NaOH (20.1 parts) dissolved in water (60 parts) and keeping the reaction solution under reflux for 10 hours.

After cooling, the product was filtered and washed with water and acetone, followed by drying at 70° C. under reduced pressure to obtain an intermediate (yield: 96.7%). This intermediate (91.1 parts) was dispersed in xylene (500 parts), followed by dropwise adding N,N'-diethylethylenediamine (23.3 parts) to the dispersion, successively feeding NaOH (16 parts) as it was, reacting the mixture under reflux for 20 hours while removing water flown out, thereafter washing with acetone and water and drying at 100° C. to obtain a product (IV) in the form of white solids. The product (IV) was insoluble in usual organic solvents and its solubility was 0.1% or less. Further, the content of remaining chlorine was 2.3%. Its decomposition-initiating temperature was 340° C.

Figure 4:
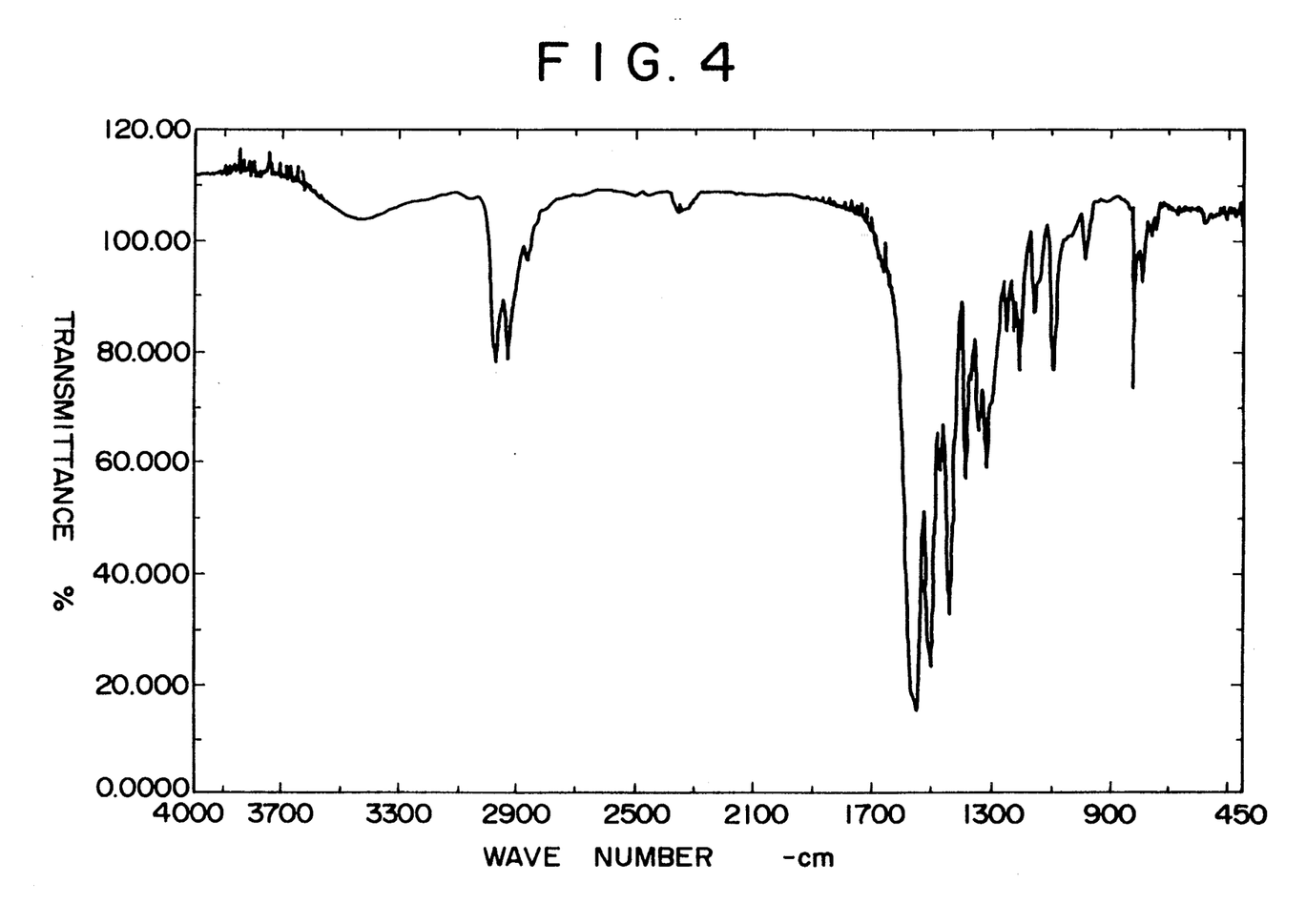
FIG. 4 shows the infrared absorption spectrum of product (IV) prepared in preparation example 4.
Figure 5:
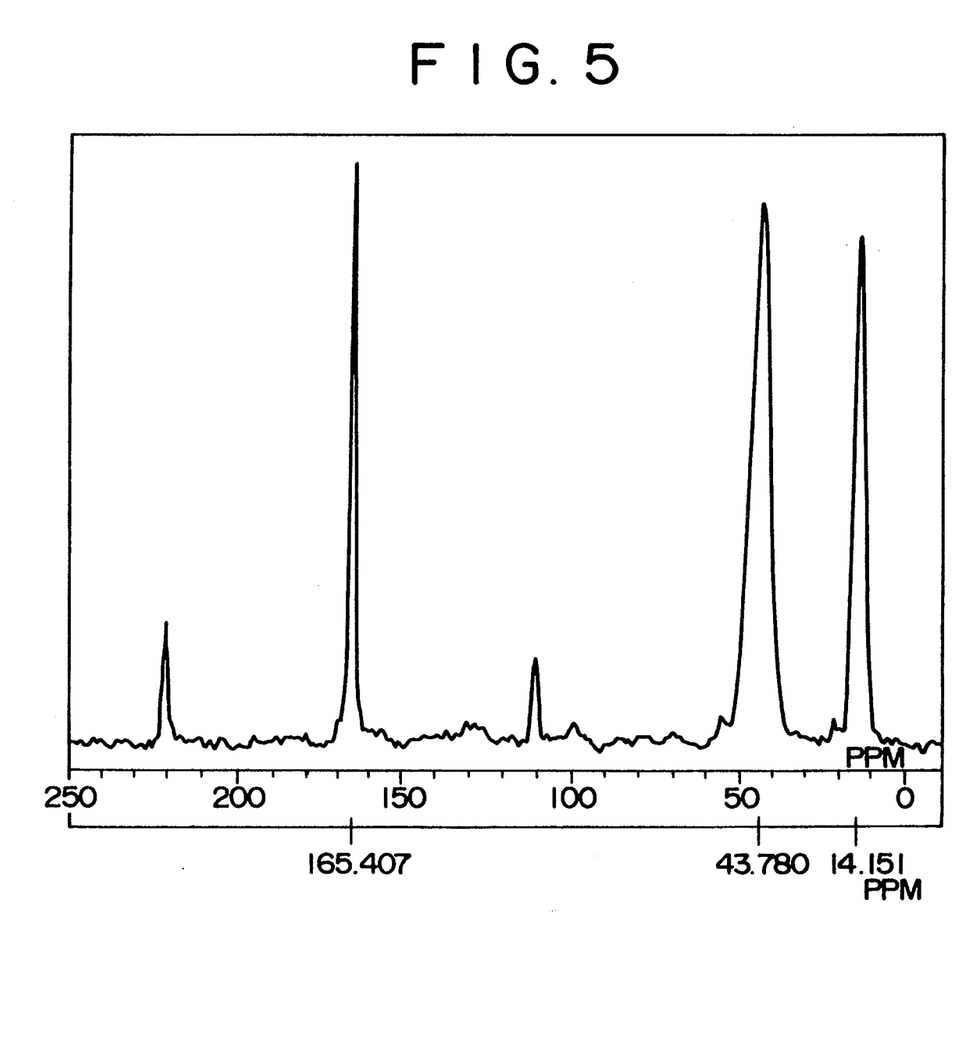
FIG. 5 shows the nuclear magnetic resonance spectrum of product (IV) papared in preparation example 4.

FIGS. 4 and 5 each show infrared absorption spectra and nuclear magnetic resonance spectra as measured under solid state.

Preparation example 5

Cyanuric chloride (94.1 parts) and acetone (300 parts) were fed into a reaction vessel similar to that of Preparation example 1, followed by simultaneously dropwise adding a solution of piperazine (21.5 parts) dissolved in water (60 parts) and a solution of NaOH(20.1 parts) dissolved in water(60 parts), while keeping the temperature at 0° to 5° C. with stirring, thereafter further agitating the mixture at the same temperature for 3 hours, allowing it to stand down to room temperature, dropwise adding a solution of piperazine (21.5 parts) dissolved in water (50 parts) over about 30 minutes, thereafter dropwise adding a solution of NaOH (20.1 parts) dissolved in water (60 parts), and keeping the reaction solution under reflux for 10 hours.

After cooling, the product was filtered, washed with water and acetone and dried at 70° C. under reduced pressure, to obtain an intermediate (yield: 99.4%). The intermediate (79.1 parts) was dispersed in water (500 parts), followed by dropwise adding a solution of piperazine (17.3 parts) in water (100 parts), successively dropwise adding a solution of NaOH (16 parts) in water (50 parts), reacting the mixture under reflux for 20 hours, thereafter washing with acetone and water and drying at 100° C. to obtain a product (V) in the form of white solids. The product (V) was insoluble in usual organic solvents and its solubility in water at room temperature was 0.1% or less. Further, the content of remaining chlorine was 7.0%. The decomposition-initiating temperature of the product was 324° C.

Figure 6:
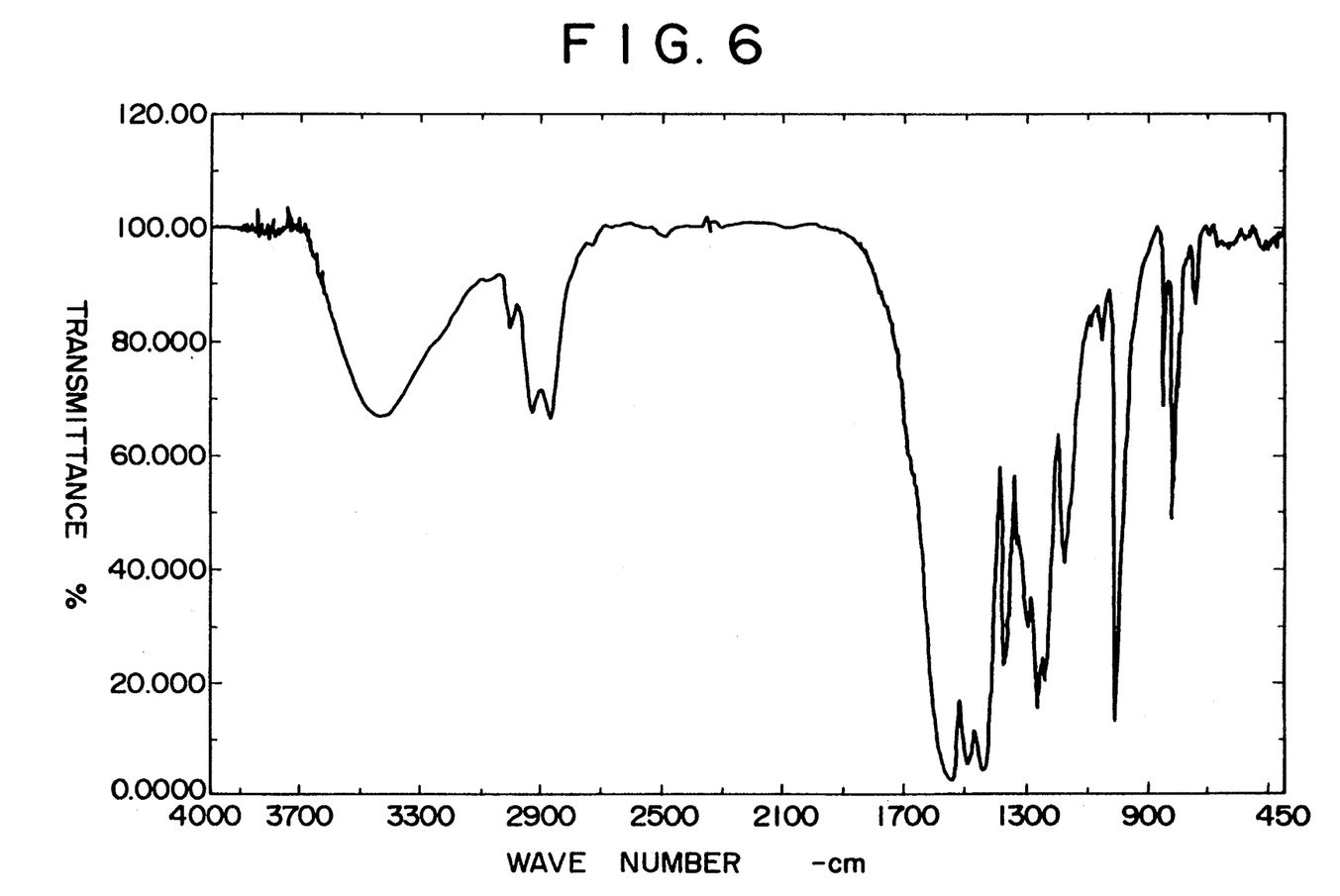
FIG. 6 shows the infrared absorption spectrum of product (V) prepared in preparation example 5.
Figure 7:
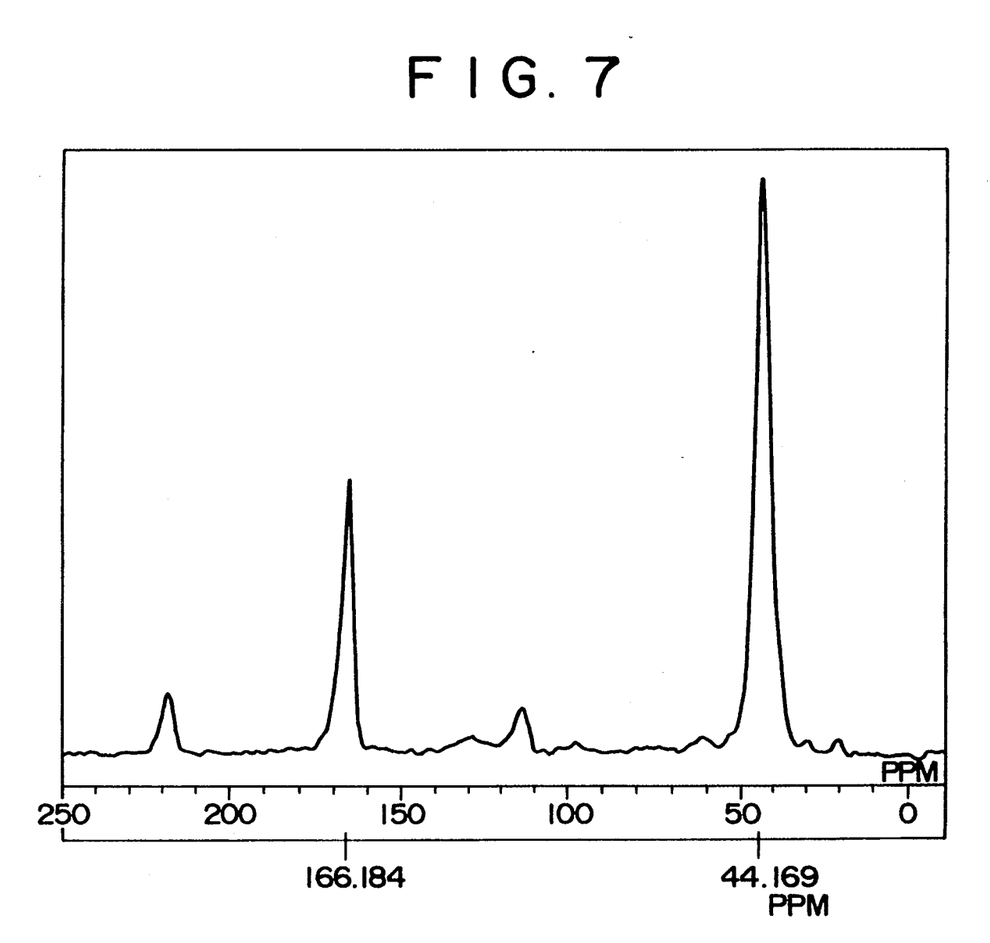
FIG. 7 shows the nuclear magnetic resonance spectrum of product (V) prepared in preparation example 5.

FIGS. 6 and 7 each show infrared absorption spectra and nuclear magnetic resonance spectra as measured under solid state.

Example 1

As a polypropylene resin, a crystalline ethylene-propylene block copolymer (70.7% by weight) (ethylene content: 8.5% by weight and melt flow rate (quantity of molten resin extruded for 10 minutes when a load of 2.16 Kg was added at 230° C.); as component (B) (APP), Exolit-422 (tradename of product made by Höchst Co., Ltd.) (21% by weight); as component (A), a material ( 8% by weight) obtained by grinding product (I) by means of a usually known grinder; and as stabilizers, 2,6-di-t-butyl-p-cresol (0.1% by weight), di-myristyl-$\beta,\beta'$-thiodipropionate (0.1% by weight) and calcium stearate (0.1% by weight), were placed in cooking mixer (tradename), followed by mixing them with stirring for one minute, melt-knead-extruding the mixture at a melt-kneading temperature of 200° C. by means of Minimax (tradename), and pelletizing.

The resulting pellets were dried at 100° C. for 3 hours. Using the pellets, test pieces for oxygen index of 6×100×3 mm were prepared by means of a heated press set to 200° C. Using the test pieces, oxygen index was measured according to JIS K7201. The results are shown in Table 1.

Example 2

Employing the same process and device as in Example 1 except that product (II) was used as component (B), the oxygen index was measured. The results are shown in Table 1.

Example 3

As a polypropylene resin, a crystalline ethylene-propylene block copolymer (49.7% by weight) (ethylene content: 8.5% by weight, and melt flow rate (quantity of molten resin extruded for 10 minutes when a load of 2.16 Kg was applied at 230° C.): 20 g/10 min.); as a polyethylene resin, an ethylene homopolymer (10% by weight) (Chissopolyethy (trademark of product made by Chisso Corporation) M680; as an ethylenic synthetic rubber or elastomer, an ethylene-propylene rubber (JSR EP (trademark of product made by Japan Synthetic Rubber Co., Ltd.) 02P (10% by weight); as APP which is component (A), Exolit 422 (tradename of product made by Höchst Co., Ltd.) (21% by weight); as component (B), a material obtained by grinding product (II) by means of a usually known grinder (8% by weight); as a silane coupling agent, vinyltrimethoxysilane (1% by weight); and as other additives,2,6-di-t-butyl-p-cresol(0.1% by weight), di-myristyl-$\beta,\beta'$-thiodipropionate (0.1% by weight) and calcium stearate (0.1% by weight), were placed in Henschel mixer (tradename), followed by mixing them with stirring for 3 minutes, and melt-kneading-extruding the resulting mixture by means of an extruder having a hole diameter of 30 mm, at a melt-kneading temperature of 200° C., to obtain pellets.

The pellets were dried at 100° C. for 3 hours, and using the pellets, a test piece for oxygen index (6×100×3 mm) was prepared by means of a heated press set to 200° C. Using the test piece, oxygen index was measured according to JIS K7201. The results are shown in Table 1.

Example 4

Oxygen index was measured employing the same process and appratus as in Example 1 except that product (III) was used as component (B), the quantity of component (A) blended was made 19.3% by weight and the quantity of component (B) blended was made 9.7% by weight. The results are shown in Table 1.

Example 5

Oxygen index was measured employing the same process and apparatus as in Example 1, except that product (IV) was used as component (B). The results are shown in Table 1.

Example 6

Oxygen index was measured employing the same process and apparatus as in Example 3, except that product (V) was used as component (B), the quantity of component (A) blended was made 19.3% by weight and the quantity of component (B) blended was made 9.7% by weight. The results are shown in Table 1.

Effectiveness of the Invention

When the compound of the present invention is combined with a phosphorus compound, a superior flame-retardancy is exhibited in a small quantity of the combination added. Further, surprisingly enough, it has been clarified that not a so far known polymer using three components of cyanuric chloride, monoamine and diamine, but even a compound consisting only of two components of cyanuric chloride and diamine, affords a high flame-retardancy even in its small quantity added. Further, due to its difficult water-solubility, it does not exude from a polymer having it blended therein, on account of moisture in air.

wherein n represents an integer of 2 to 6 and $R_1$ and $R_2$ each represent H or $C_mH_{2m+1}$ wherein m represents an integer of 1 to 3.

3. A flame-retardant according to claim 1 wherein said diamine is piperazine or a diamine containing piperazine ring.

4. A flame-retardant resin composition having a flame-retardant composed of

TABLE 1

| | Polypropylene*1 wt. % | Polyethylene*2 wt. % | Synthetic rubber*3 wt. % | Silane coupling agent*4 wt. % | Stabilizer*5 wt. % | Component (A) wt. % | Component (B) wt. % | Oxygen index |
| --- | --- | --- | --- | --- | --- | --- | --- | --- |
| Example 1 | 70.7 | | | | 0.3 | 21.0 | 8.0 | 34.7 |
| Example 2 | 70.7 | | | | 0.3 | 21.0 | 8.0 | 36.5 |
| Example 3 | 49.7 | 10.0 | 10.0 | 1.0 | 0.3 | 21.0 | 8.0 | 35.1 |
| Example 4 | 70.7 | | | | 0.3 | 19.3 | 9.7 | 30.1 |
| Example 5 | 70.7 | | | | 0.3 | 21.0 | 8.0 | 30.3 |
| Example 6 | 49.7 | 10.0 | 10.0 | 1.0 | 0.3 | 19.3 | 9.7 | 32.9 |

*1 an ethylene-propylene block copolymer (made by Chisso Corporation, ethylene content: 8.5%, melt flow rate: 20 g/10 min.)
*2 an ethylene homopolymer (made by Chisso Corporation, Chisso Polyethy (trademark of product made by Chisso Corporation, M 680), melt index: 6.5 g/10 min. (190° C.))
*3 an ethylene-propylene rubber (JSR EP (trademark) 02P, made by Japan Synthetic Rubber Co., Ltd.
*4 Vinyl trimethoxysilane (Silaace (trademark) S210, made by Chisso Corporation)
*5 a mixture of 2,6-di-butyl-p-cresole, di-myristyl-β,β'-thiodipropionate and Ca stearate (ratio, 1:1:1)
Component (A): Exolit-422 (tradename of Höchst Co., Ltd.)
Component (B): products (I) to (V)

What we claim is:

1. A flame-retardant composed of
   (A) a reaction product of cyanuric chloride with a diamine and
   (B) ammonium polyphosphate or polyphosphoric acid amide,
   the ratio by weight of (A) to (B) being 0.15 to 1.

2. A flame-retardant according to claim 1, wherein said diamine is expressed by the formula $HNR_1(CH_2)_nR_2NH$ (A) a reaction product of cyanuric chloride with a diamine and
   (B) ammonium polyphosphate or polyphosphoric acid amide,
   the ratio by weight of (A) to (B) being 0.15 to 1,
   blended with a thermoplastic resin, in a quantity of 1 to 50% by weight based upon the weight of the composition.

5. A flame-retardant composition according to claim 4 wherein said thermoplastic resin is a polyolefin or its elastomer.

* * * * *